United States Patent
Cao (10) Patent No.: US 9,595,790 B1
(45) Date of Patent: Mar. 14, 2017

(54) ELECTRIC VEHICLE CHARGE PORT

(71) Applicant: Faraday&Future Inc., Gardena, CA (US)

(72) Inventor: Chi Hung Cao, Huntington Beach, CA (US)

(73) Assignee: Faraday&Future Inc., Gardena, CA (US)

( * ) Notice: Subject to any disclaimer, the term of this patent is extended or adjusted under 35 U.S.C. 154(b) by 0 days.

(21) Appl. No.: 15/064,465

(22) Filed: Mar. 8, 2016

(51) Int. Cl.
  H01R 13/639 (2006.01)
  H01R 33/00 (2006.01)
  H01R 13/629 (2006.01)
  B60L 11/18 (2006.01)

(52) U.S. Cl.
  CPC .... H01R 13/62911 (2013.01); B60L 11/1818 (2013.01); H01R 13/62922 (2013.01)

(58) Field of Classification Search
  CPC ...... H01R 13/629; H01R 43/26; H01R 13/62; H01R 13/447; H01R 13/453; H01R 13/4532; H01R 13/4534; H01R 13/4536; H01R 13/6397; H01R 13/639; H01R 13/62922; H01R 13/62911; B60L 11/1818; B60L 11/1816; B60K 15/05; B60K 1/04
  USPC ......... 439/34, 134, 135, 345, 136, 138, 142, 439/149, 310, 312, 551, 911, 952, 133; 320/107, 109
  See application file for complete search history.

(56) References Cited

U.S. PATENT DOCUMENTS

| | | | |
|---|---|---|---|
| 8,616,909 B2* | 12/2013 | Kurumizawa | E05B 83/00 320/109 |
| 9,199,551 B2* | 12/2015 | Kahara | B60L 1/003 |
| 2012/0133326 A1* | 5/2012 | Ichikawa | B60L 11/14 320/109 |
| 2012/0238122 A1* | 9/2012 | Hirashita | B60L 11/1818 439/304 |
| 2013/0089999 A1* | 4/2013 | Martin | H01R 13/6395 439/345 |
| 2013/0102163 A1* | 4/2013 | Basavarajappa | B60K 15/05 439/34 |
| 2013/0255333 A1* | 10/2013 | Kurumizawa | E05B 83/28 70/237 |
| 2013/0260597 A1* | 10/2013 | Kurumizawa | H01R 13/639 439/347 |
| 2016/0087375 A1* | 3/2016 | Yoshizawa | B60K 1/04 439/345 |

* cited by examiner

Primary Examiner — Abdullah Riyami
Assistant Examiner — Harshad Patel
(74) Attorney, Agent, or Firm — Knobbe, Martens, Olson & Bear LLP (57) ABSTRACT

Certain aspects relate to systems and techniques for flexibly and movably mounting a charge port in front-facing portions of an electric vehicle. When not in use the charge port can be concealed by the body of the vehicle. In a pre-charging or charging mode the charge port can be automatically moved to a charging position where it is exposed through the vehicle body and thus available for coupling with a charging connector at a charging station. Further, the charge port can be flexibly mounted to the vehicle so as to absorb impact forces in one or more directions. The charge port can include oscillation dampening mechanisms for electrical cables coupled to the charge port.

19 Claims, 12 Drawing Sheets

ELECTRIC VEHICLE CHARGE PORT

CROSS-REFERENCE TO RELATED APPLICATIONS

The present application is related to Ser. No. 15/064,462, entitled "ELECTRIC VEHICLE CHARGE PORT," filed on the same day as this application. The content of the above-referenced application is hereby incorporated by reference herein in its entirety and for all purposes.

TECHNICAL FIELD

The systems and methods disclosed herein are directed to electric vehicle charge ports, and, more particularly, to charge ports mounted flexibly and movably and in a front side of the vehicle.

BACKGROUND

Plug-in hybrids and all-electric vehicles can be propelled by one or more electric motors using electrical energy stored in one or more rechargeable batteries or another energy storage device. A charger or charging connector at a charging station may be plugged in to a charge port located on the vehicle to charge the vehicle's power source. The charge port for such plug-in hybrids and all-electric vehicles is typically externally mounted to allow easy access to the charge port and the ability to lock the passenger compartment while the vehicle is being charged. While conventional low voltage power sources may be used to charge vehicle batteries, high voltage charging stations are available to replenish electric vehicle battery charge at a faster rate than the low voltage power sources.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

In some implementations, a charge port for an electric vehicle includes a charge port body. The charge port body may include at least one electrical contact configured to be electrically coupled to a corresponding electrical contact of a charging station connector. A housing may secure the charge port body to a portion of the electric vehicle. A motor may be coupled to the charge port body. The motor may be configured to move the charge port body between a first position and a second position relative to the housing. In the first position, the electrical contact of the charge port body may be concealed by a portion of an exterior of the electric vehicle. In the second position, the electrical contact of the charge port body may be exposed through the portion of the exterior of the electric vehicle.

A method for automatically exposing a charge port of an electric vehicle may include one or more of the following steps. The method may include determining that the electric vehicle is in a pre-charging mode. In response to determining that the electric vehicle is in the pre-charging mode, a motor to move the charge port from a first position to a second position may be activated. When the charge port is located in the first position an electrical contact of the charge port may be concealed by a portion of an exterior of the electric vehicle. When the charge port is located in the second position the electrical contact of the charge port may be exposed through the portion of the exterior of the electric vehicle.

In some implementations, a movable charge port for an electric vehicle includes a housing secured within a portion of the electric vehicle. A charge port body may be disposed at least partially within the housing. The charge port body may include at least one electrical contact configured to be electrically coupled to a corresponding electrical contact of a charging station connector. A hinge may be coupled to at least a portion of the charge port body. A motor may be coupled to the hinge. The motor may be configured to move the charge port body between a first position and a second position relative to the housing.

In some implementations, a charge port for an electric vehicle includes a charge port body including at least one electrical contact configured to be electrically coupled to a corresponding electrical contact of a charging station connector. A housing may be used to secure the charge port body to a portion of the electric vehicle. At least one cable may extend between the charge port body and a battery of the electric vehicle. The cable may electrically couple the at least one electrical contact of the charge port body with the battery. At least one wall may be spaced apart from the housing. The at least one wall may include an elongate slot. The at least one cable may extends through the elongate slot. A bushing may secure the at least one cable. The bushing may be slidable within in the elongate slot.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

In manual charging systems, in order to recharge the vehicle's power source the operator of the vehicle may have to handle a high-voltage cable or charging connector, which may be dangerous, especially during conditions such as darkness or inclement weather. Additionally, electric vehicle charge ports are typically located along the side of the vehicle similar to gas tank inlets on combustion-engine-powered vehicles. However, in parking garages, both residential and public, it may not be practical for a charging station to be located along the side of a vehicle, particularly in parking areas designated for multiple electric vehicles where each vehicle may require a charging station.

The aforementioned problems, among others, are addressed in some embodiments by the charge port disclosed herein that can be movably mounted in the vehicle. The movable nature of the charge port can facilitate automated coupling with a charger of a charging station for replenishing the electric vehicle battery. During driving or non-charging parking of the vehicle a charge port as disclosed herein can be concealed by the exterior or body of the vehicle. In a pre-charging mode or charging mode the charge port can be automatically moved to a charging position where it is exposed through a portion of the vehicle body and is then available for coupling with a charging connector at a charging station.

Further, some charge ports according to the present disclosure can be mounted in a front-facing portion of the vehicle. Front-facing mounting of the charge port can facilitate connection with a charging station positioned in front of the vehicle when the vehicle is parked. Such front-mounted charge ports may be contained within a housing that is flexibly mounted within the vehicle such that the housing is movable during low-impact collisions, for example to absorb or cushion impact in one or more directions during collision between the vehicle front and another vehicle or other object.

Embodiments of the disclosure relate to systems and techniques for flexibly and movably mounting a charge port in front-facing portions of an electric vehicle. When not in use, the charge port can be concealed by the body of the vehicle. Concealing the charge port in the body of the vehicle when not in use can protect the charge port from damage, and can prevent direct external connection to the electrical systems of the vehicle. In pre-charging or charging scenarios, the charge port can be automatically moved to a charging position where it is exposed through the vehicle body and thus available for coupling with a charging connector at a charging station. Accordingly, the charge port can be automatically movable between the non-charging concealed position and charging exposed position, for example by one or more motors and corresponding mechanical systems and software systems designed to facilitate movement between positions.

Further, some charge ports as described herein can be mounted in a front-facing portion of the vehicle to facilitate connection with a charging station positioned in front of the vehicle (that is, in view of an operator of the vehicle) when parked and in need of replenishment of stored battery charge. Such front-mounted charge ports may be flexibly mounted within the vehicle such that they are movable during low-impact collisions, for example by one or more springs or other shock-absorbing structures. For example, a front-mounted charge port may be contained within a housing that is flexibly mounted within the vehicle such that the housing is movable during low-impact collisions, for example to comply with standards for front-impact collisions and/or to absorb or cushion impact during collision between the vehicle front and another vehicle or other object.

Due to the movable nature of the charge port, the power cable or cables connecting the charge port to the battery bank or other power source of the vehicle can be movably mounted to absorb oscillations resulting from movement of the charge port. For example, the cables can be mounted within a bushing or other isolating mechanical device designed to reduce vibrations. The bushing can be movably mounted within an elongated slot in a surface of or adjacent to the charge port housing. In some implementations, the bushing can be a rubber bushing having a number of apertures corresponding to number of cables passing through the bushing. The elongated slot can have a similar width to the diameter or width of the bushing but can have a length greater than the diameter or length of the bushing, thereby allowing movement of the bushing through the length of the elongated slot. Some implementations of the elongated slot may be formed along a curve to allow for both vertical and horizontal displacement of the bushing. The bushing may be spring-loaded to maintain a default position in the absence of forces due to movement of the charge port housing.

As used herein, the term "electric vehicle" can refer to any vehicle that is partly ("hybrid vehicle") or entirely operated based on stored electric power. Such vehicles can include, for example, road vehicles (cars, trucks, motorcycles, buses, etc.), rail vehicles, underwater vessels, electric aircraft, and electric spacecraft.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example Charge Port Movement

Figure 1A:
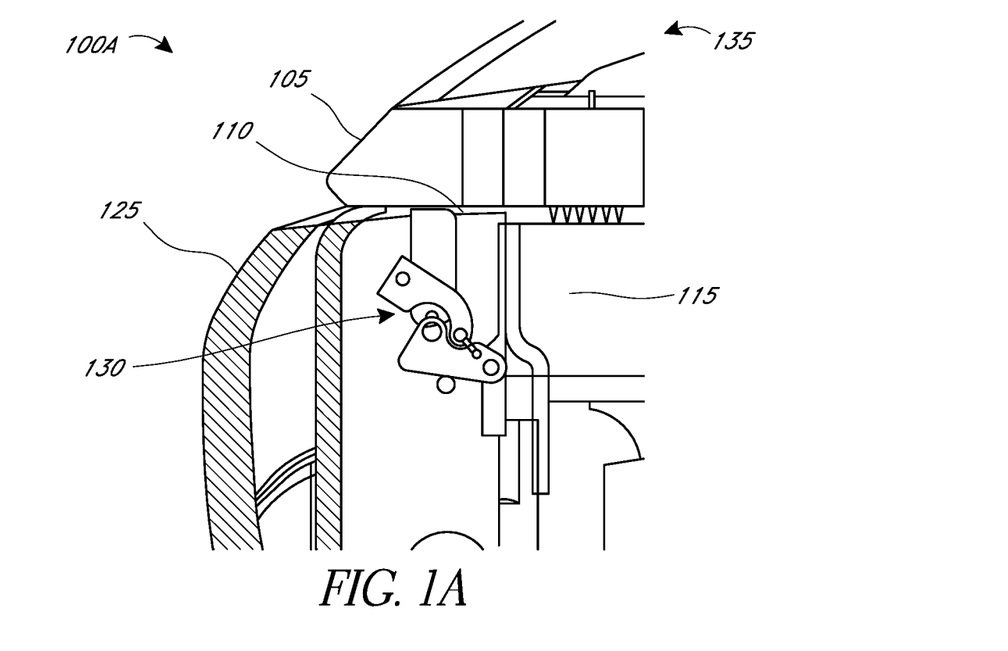
FIG. 1A is an example graphical representation of a movable electric vehicle charge port in a concealed position.
Figure 1B:
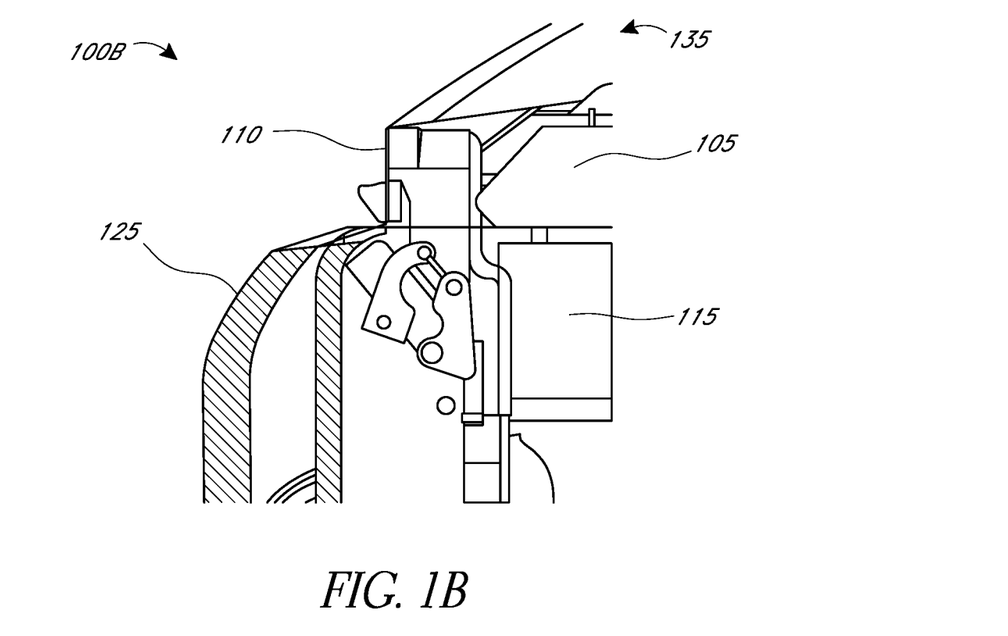
FIG. 1B is an example graphical representation of the movable electric vehicle charge port of FIG. 1A in an exposed position.
Figure 1C:
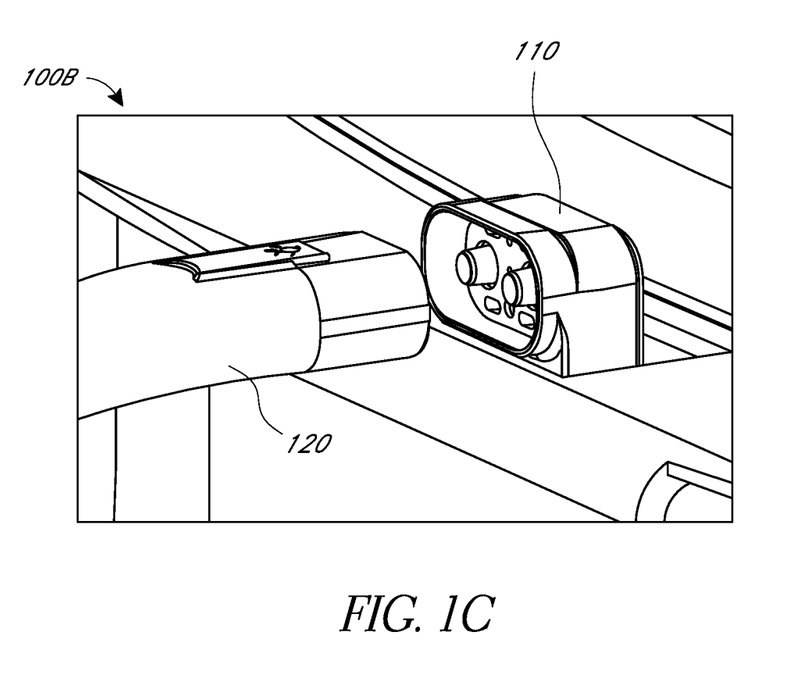
FIG. 1C is an example graphical representation of a charging station connector and the movable electric vehicle charge port in the exposed position of FIG. 1B.

FIGS. 1A-1C generally depict a movable charge port 110 of an electric vehicle 135, where the charge port 110 is depicted in FIG. 1A in a concealed position 100A, the charge port 110 is depicted in FIG. 1B in an exposed position 100B, and where FIG. 1C also depicts a charging station connector 120 for coupling with the exposed charge port 110. In FIG. 1A, the charge port 110 is not visible as it is both positioned behind a portion 105 of the vehicle and within the housing 115. FIG. 1C is a closer view of the system in the exposed position 100B of FIG. 1B, with the charging connector 120 in close proximity to the charge port 110.

Referring generally to all three of FIGS. 1A-1C, charge port 110 is disposed in a housing 115 in the interior of a portion of electric vehicle 135. As discussed in more detail below, the housing 115 can be flexibly mounted to the portion of the electric vehicle. A motorized hinge mechanism 130 can move the charge port 110 relative to the housing 115 between the concealed position 110A and the exposed position 110B. The charge port 110 may comprise a charging interface configured to electrically connect and/or couple with a charging station connector 120 of a charging station (not shown). The charging interface may comprise one or more conductive pins capable of transferring power from a high voltage source to battery charging circuitry connected to one or more batteries of the electric vehicle, and optionally one or more conductive pins capable of transferring data signals between a charge port controller and a charging station controller.

In the illustrated example, charge port 110 is located in a front portion of the electric vehicle behind bumper 125. In other examples the location of the charge port 110 can be varied. The charge port may be located along a front-facing or back-facing portion of the vehicle, an upper portion of the vehicle, a side-facing portion of the vehicle, or a bottom portion of the vehicle. Locating a charge port 110 near the front end of a vehicle may be desirable because the portion of the vehicle containing the charge port 110 may be visible to the driver, allowing the driver to accurately position the charge port 110 in close proximity to a charging station. In both manual and automated parking environments, a charge port 110 located at the front of a vehicle may permit a vehicle to pull forward into a parking space and utilize a charging station located at the interior end of the parking space, such as on an adjacent wall or sidewalk.

As illustrated in FIGS. 1A and 1B, a portion 105 of the exterior of the electric vehicle 135 can be displaced so that the charge port 110 can move from its concealed position 100A, in which it is located inside of the body of the vehicle, to its exposed position 100B. In the exposed position 100B the charge port 110 is revealed through the body of the vehicle such that it can electrically connect with the charging station connector 120. In some embodiments, in the exposed position 100B the charge port 110 may protrude partially or completely from the vehicle body. In other embodiments, in the exposed position 100B the charge port may still be positioned inside of the vehicle body with its charging interface positioned to receive the charging station connector 120.

In the illustrated embodiment, the portion 105 of the vehicle body can be a front portion such as a front light. The portion 105 can also be a door in the vehicle body that can be mechanically opened to accommodate connection between the charge port 110 when in the exposed position 100B and the charging station connector 120.

The automated movement of the charge port 110 between the concealed position 100A and the exposed position 100B can occur, in some embodiments, in response to determination of proximity of the electric vehicle 135 to a charging station. For example, in an automated parking mode, sensors on the vehicle can be used to align the vehicle in a designated parking area without user intervention. The designated parking area may include a charging station, for example along a front portion of the vehicle. The sensors on the vehicle may provide input to the charge port control module or processor indicating that the vehicle is located within a predefined envelope of the charging station. In other embodiments, charging station connector 120 may include one or more sensors to detect when a user has moved the connector 120. The charging station and/or connector 120 may transmit a determination to a nearby electric vehicle to enter a pre-charging mode to move the charge port 110 into the exposed position 100B. As used herein, the terms "pre-charging mode" and "pre-charging condition" refer to the vehicle being within the predefined envelope but not yet coupled to the charging station connector. In some implementations, determination of the "pre-charging mode" and "pre-charging condition" can further involve calculating that the current charge state of the electric vehicle battery bank is at less than a threshold level of its total capacity, for example less than 85%-100% of the total charge storage capacity of the battery banks.

In response to a determination that the vehicle is in a pre-charging condition, the charge port 100 may be controlled to move from the concealed position 100A to the exposed position 100B. In the exposed position 100B, one or more sensors on the vehicle and/or charge port 110 can communicate with the charging station to coordinate alignment of the charge port 110 and charging station for automated charging. In some implementations, the described automated movement of the charge port 110 can be accomplished without user intervention, for example under control of a processor executing computer-executable instructions. The battery management system of the vehicle may operate to retain enough stored power for automated movement of the charge port into the exposed position 100B. Some implementations may additionally comprise features to enable user-controller movement of the charge port 110, for example a button to cause automated movement of the charge port, or even mechanical features for the user to manually move the charge port into the exposed position in case vehicle battery power becomes depleted.

Following the coupling of the connector 120 with the charge port 110, current may flow from the charging station (not shown) to one or more batteries of the vehicle 135 through the charge port 110. Charging may continue until the batteries are partially or fully charged. When sufficient charging has occurred, or when it is desired to disconnect the vehicle from the charging station for any other reason, the connector 120 may be uncoupled from the charge port 110, either manually or automatically. After uncoupling the connector 120 from the charge port 110 it may be moved, either manually or automatically, to its concealed position 110A and the portion 105 of the electric vehicle exterior may be moved to its position concealing the charge port 110.

Overview of Example Charge Port Structure

Figure 2A:
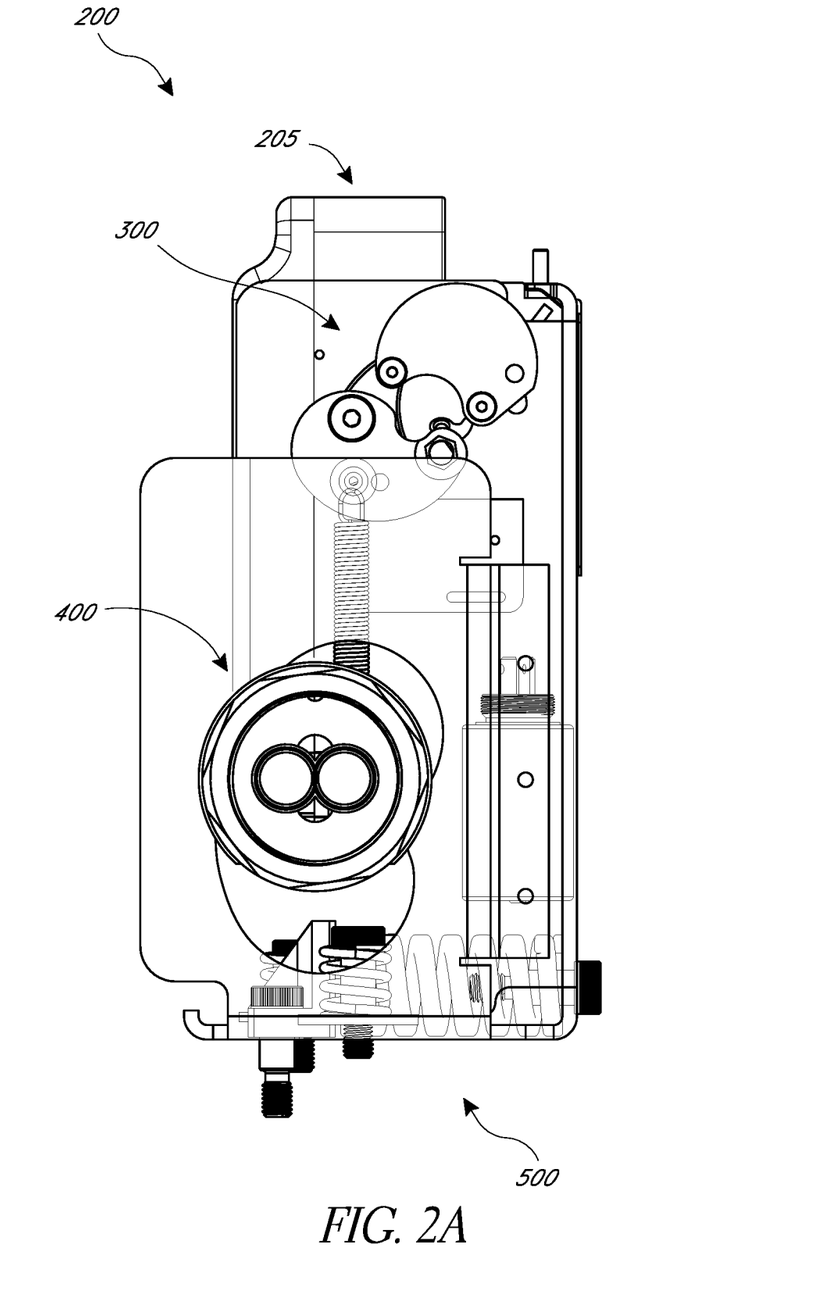
FIG. 2A illustrates a left side view of an example of an electric vehicle charge port.
Figure 2B:
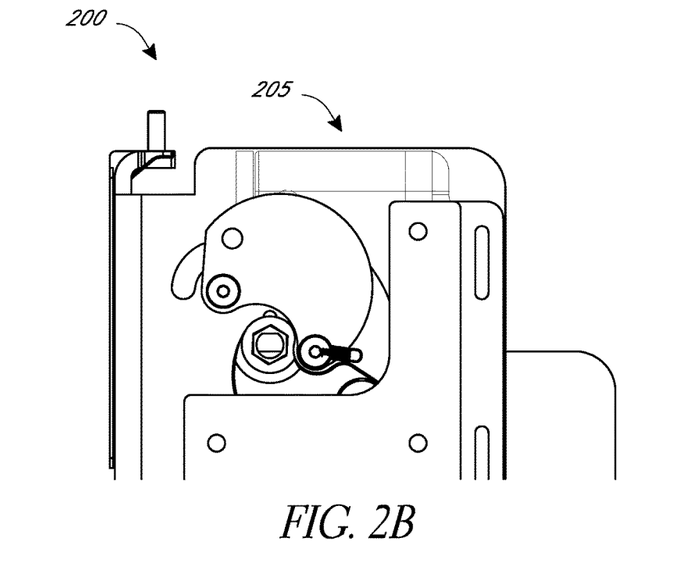
FIGS. 2B and 2C illustrate the charge port of FIG. 2A in concealed and revealed positions, respectively.
Figure 2C:
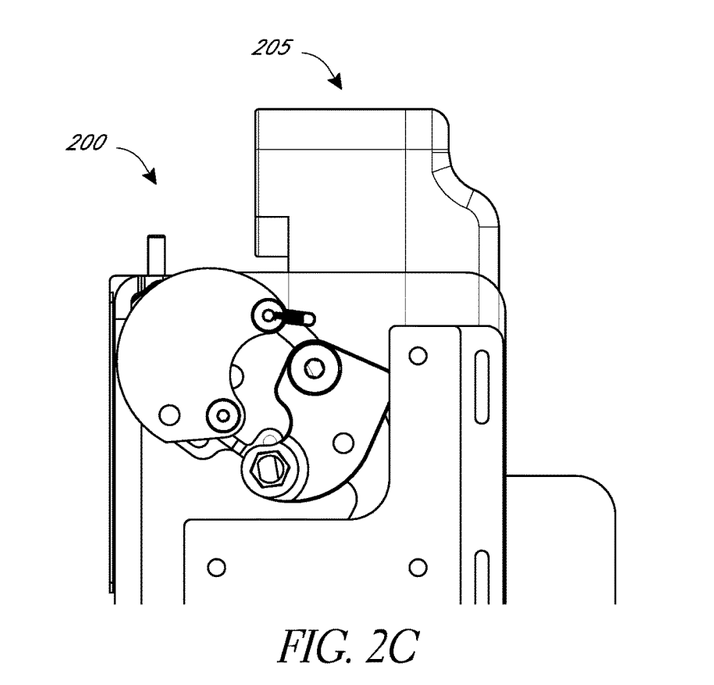

FIG. 2A illustrates a left side view of an example of an electric vehicle charge port 200 with a charge port body 205 in between a concealed position and an exposed position. FIG. 2B illustrates a right side view of the electric vehicle charge port 200 with the charge port body 205 in a fully concealed position, and FIG. 2C illustrates a right side view of the electric vehicle charge port 200 with the charge port body 205 in a fully exposed position. Certain port housing and adjacent wall features of FIGS. 2A-2B are illustrated with transparency for purposes of illustration, though it will be understood that such features can be implemented using opaque materials such as metal or composites. As shown, the charge port 200 includes a charge port body 205 housing a charging interface, a movement mechanism 300 to transition the charge port body 200 between its concealed position and exposed position, a dampener or dampening mechanism 400 for dampening oscillations imparted to cables extending between the charge port 200 and vehicle battery, and a flexible mounting 500 coupling the housing of the charge port 200 to a portion of the electric vehicle. The components of the movement mechanism 300 are described in more detail below with respect to FIGS. 3A-3E. The dampening mechanism 400 for dampening oscillations imparted to cables extending between the charge port 200 and vehicle battery is described in more detail below with respect to FIG. 4. The flexible mounting 500 is described in more detail with respect to FIG. 5.

Figure 3A:
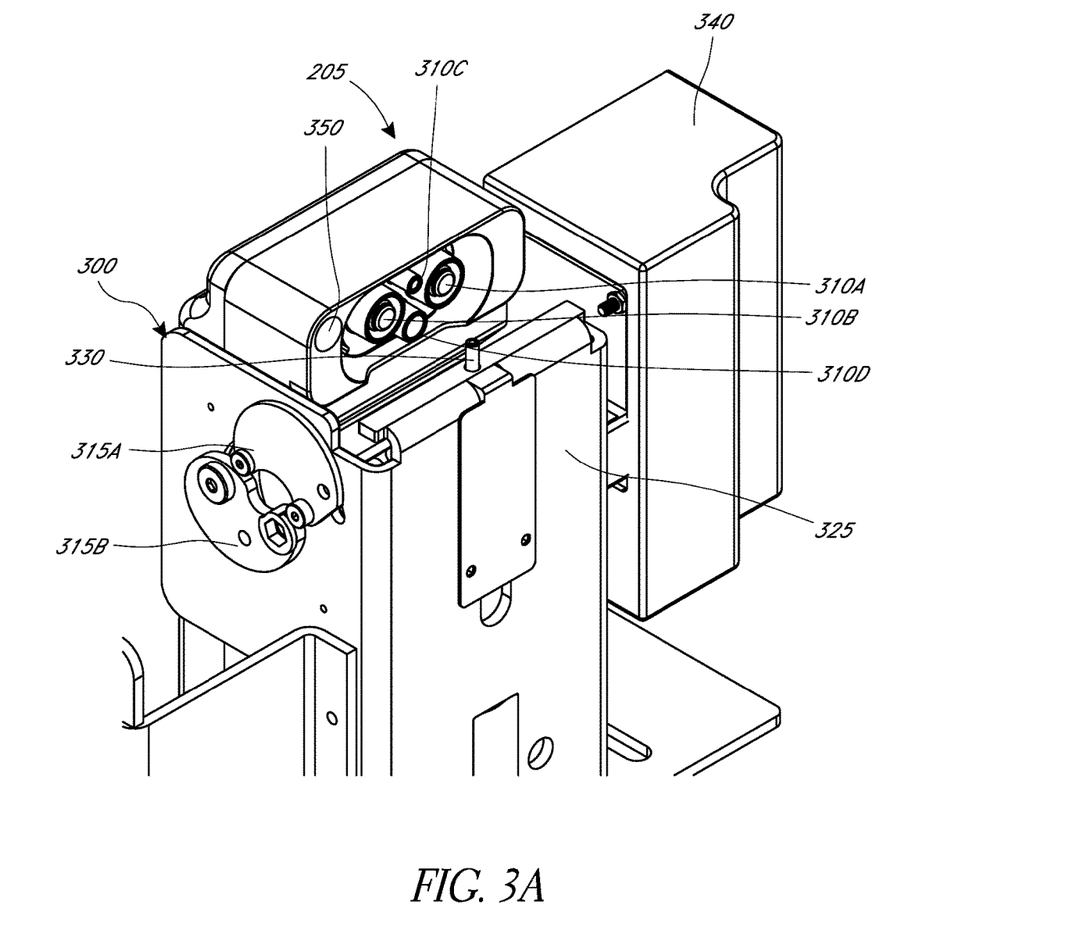
FIGS. 3A-3E illustrate various views of an example of the port movement mechanisms for the charge port of FIGS. 2A-2C.
Figure 3B:
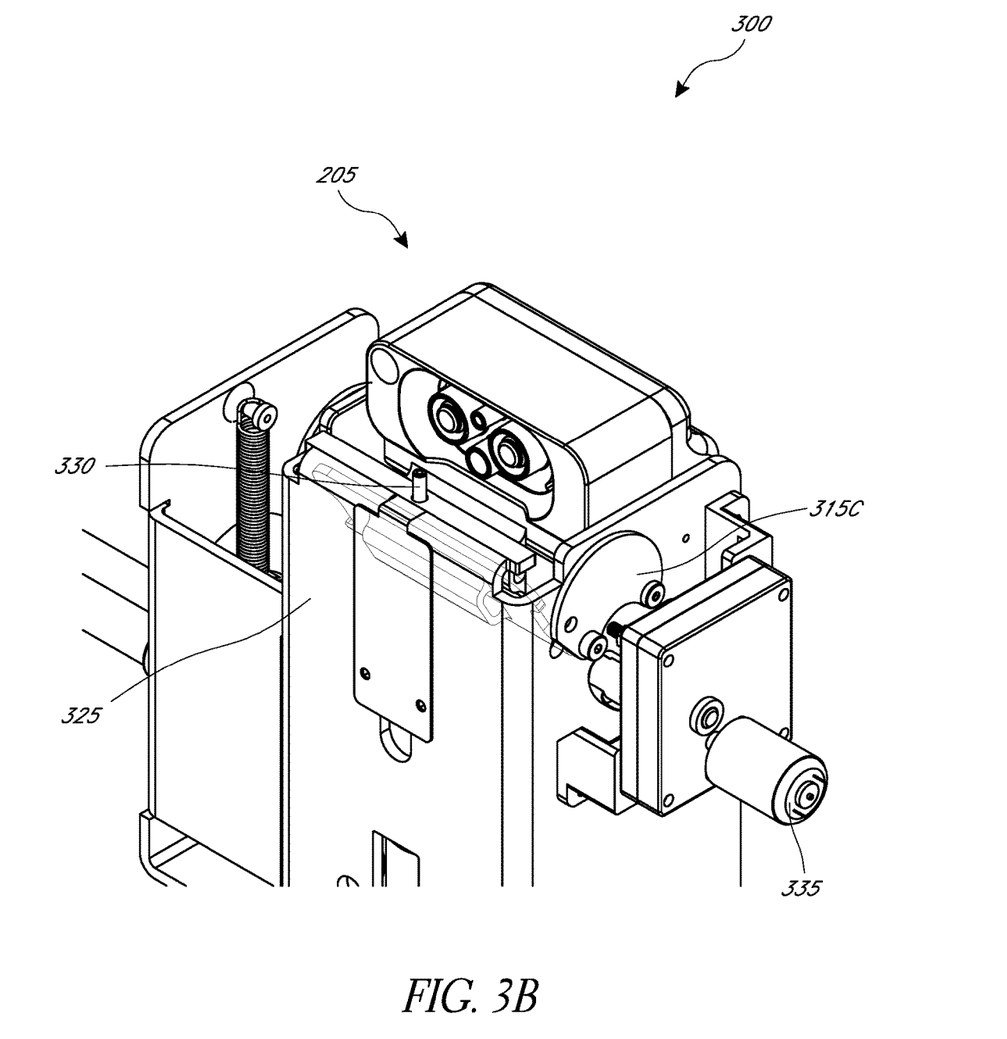
Figure 3C:
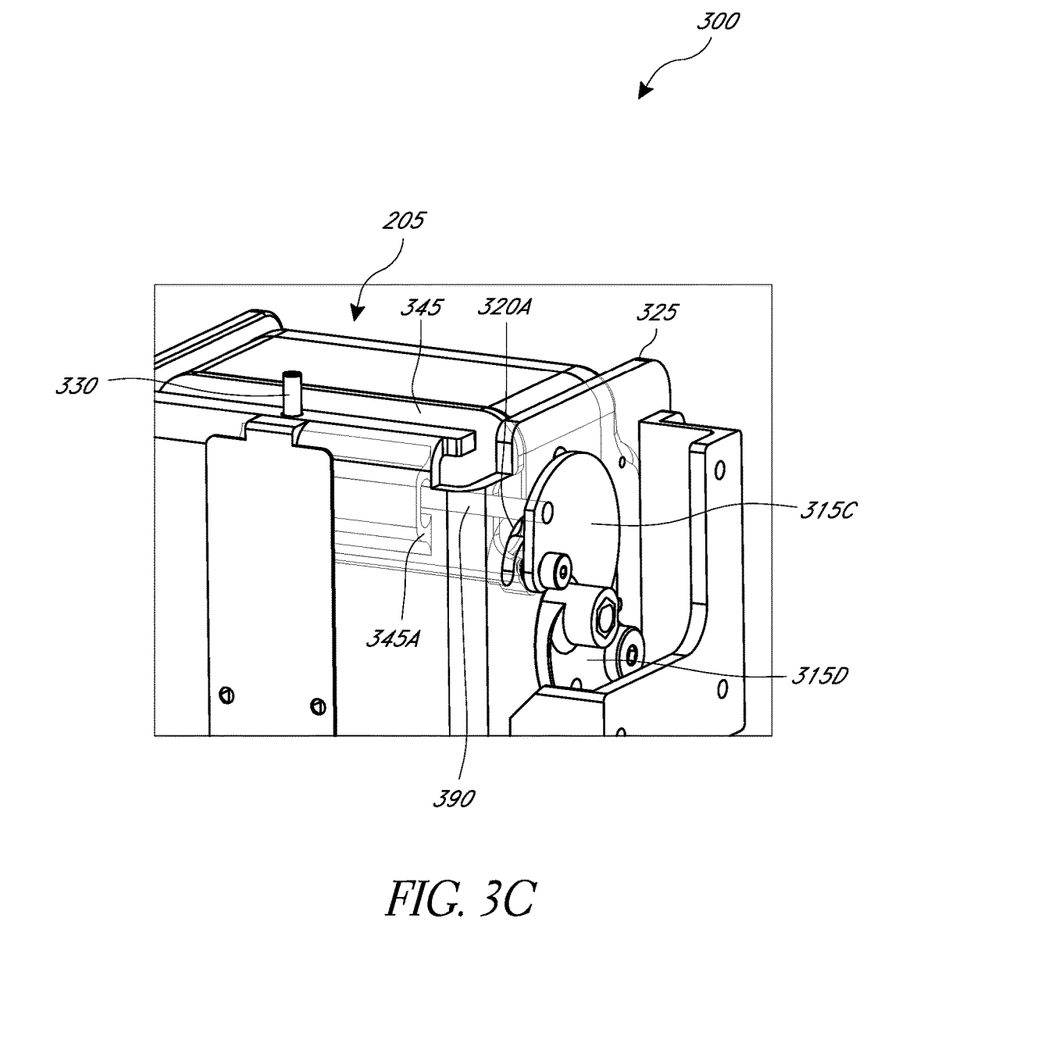
Figure 3D:
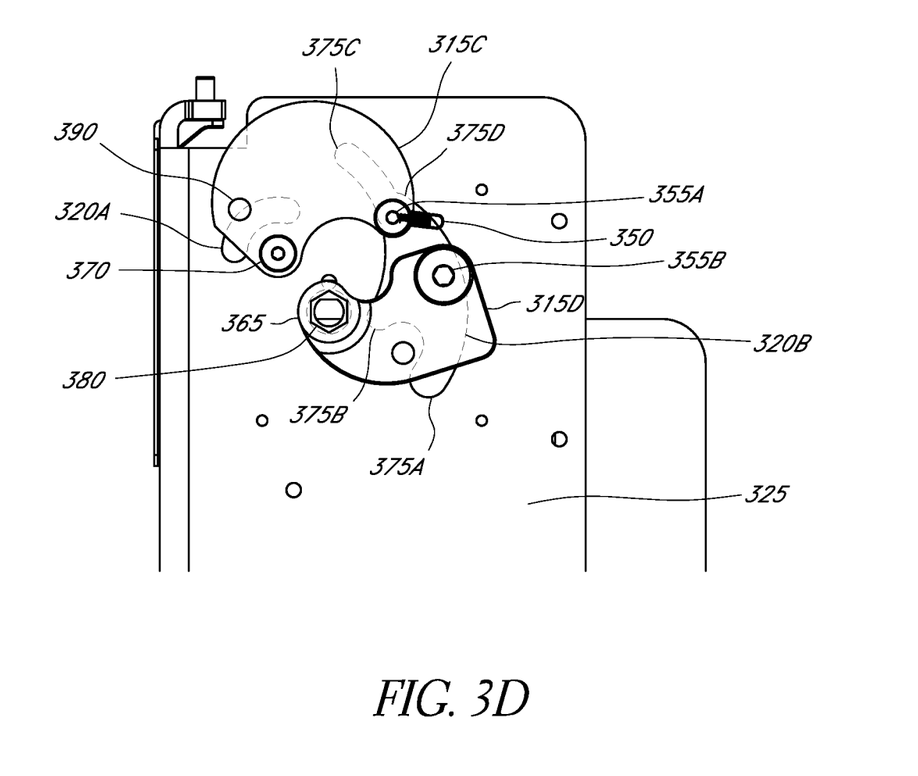
Figure 3E:
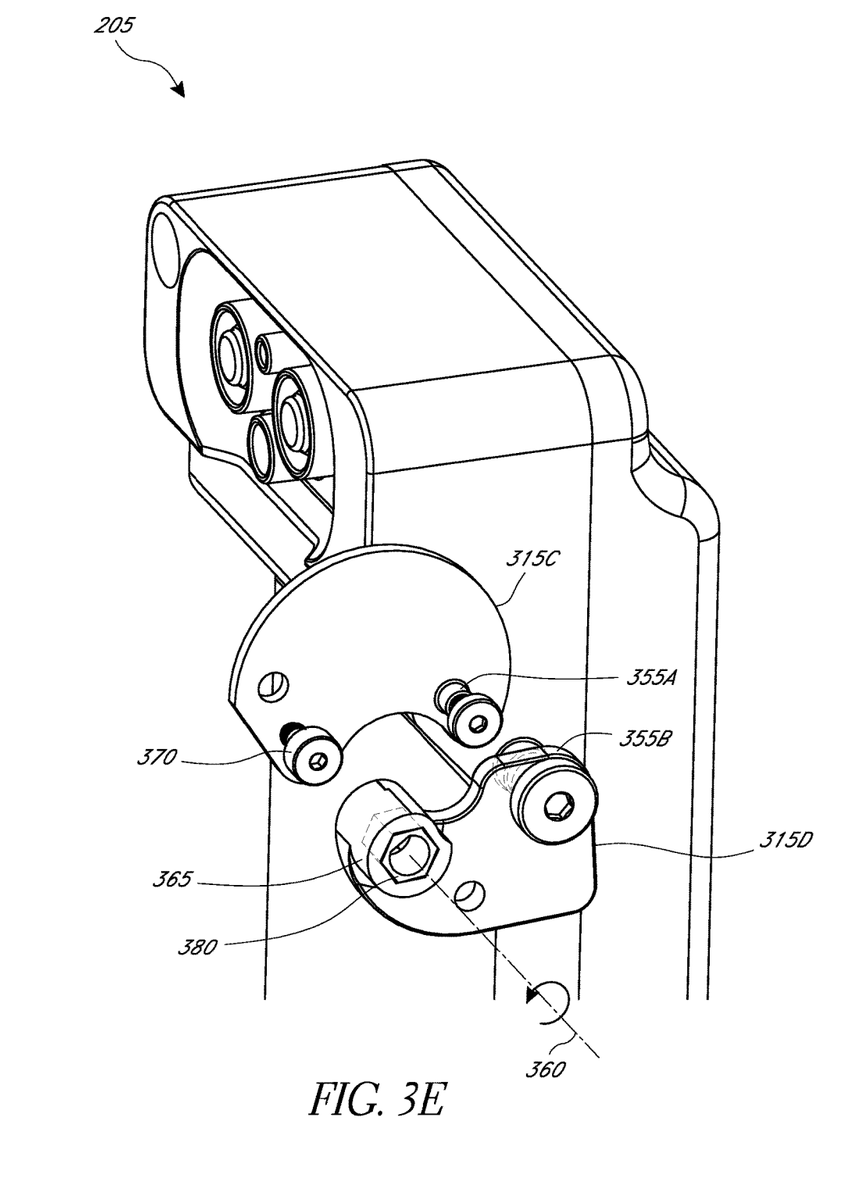

FIG. 3A depicts a front, left, and top isometric view of the movable charge port. As shown, the charge port body 205 is in between the fully concealed and fully exposed positions. The movement mechanism 300, charge port body 205, housing 325, and an example exterior of control unit 340 are illustrated. FIG. 3B depicts a front, right, and top isometric view of the movement mechanism 300, charge port body 205, and port housing 325 with the exterior of control unit 340 not shown to illustrate the motor 335 contained therein. FIG. 3C depicts a front, right, and top isometric view of the movement mechanism 300 and charge port body 205 with the port housing 325 illustrated with transparency to show interior features and the charge port body 205 in the fully concealed position. FIG. 3D depicts a right side view of a motor hinge 315D and hinge 315C and the underlying slots 320A, 320B in the right side of the port housing 325. FIG. 3E depicts example rotational couplings 315C, 315D between hinges 315C, 315D and the charge port body 205 with the hinges 315C, 315D shown with transparency to depict the rotational couplings 315C, 315D.

With reference now to the components of the movement mechanism 300 illustrated in FIGS. 3A-3E, the charge port body 205 houses the charging interface comprising a plurality of conductive pins 310A-310D. The conductive pins can include power pins 310A, 310B for AC and/or DC power, a ground pin 310D, and a signal pin 310C for communicating data between a controller of the charge port 205 and a charging station. Such data can include, for example, AC charging levels, voltage, phase, peak current, signals to initiate or terminate charging, and the like. The charging interface of the charge port may further include a proximity detection pin that electrically couples with a corresponding proximity pin of the charging station connector, where the proximity detection pins are configured to break first (that is, before the power pins) when the connector and vehicle charge port are decoupled thereby stopping the flow of power through the charger. The charge port body 205 may further include a location transmitter 301 for communicating the location of the exposed charging interface to the connector of a charging station. Location transmitter 301 can be an ultrasonic transducer, a magnetic position sensor, or marking detectable by an optical sensor in various embodiments.

The depicted charge port body 205 is movably coupled to port housing 325 by hinges 315A, 315B, 315C and motor hinge 315D. Hinges 315A and 315B are provided on a first wall of the port housing 325 and a first side of the charge port body 205, and hinges 315C and 315D are provided on a second wall of the port housing 325 opposite the first wall and on an opposing side of the charge port body 205. As illustrated with respect to motor hinge 315D and hinge 315C, each hinge 315A-315D is rotatably coupled to the charge port body 205 by a rotational coupling 355A, 355B. Although not illustrated, hinges 315A, 315B are also coupled by rotational couplings to the charge port body 205. Hinge 315C is illustrated as being rotatably coupled to a wall of the port housing 325 by rotational coupling 370, and hinge 315D is illustrated as being rotatably coupled to a wall of the port housing 325 by rotational coupling 365. Thus, each of hinges 315A-315D is rotatably coupled to the port housing 325 at a first point and rotatably coupled to the charge port body 205 at a second point spaced apart from the first point. A spring 350 can be coupled to hinge 315C to set motion bias. Similar springs can be coupled to any of hinges 315A, 315B, and 315D. These hinges 315A-315D may or may not be coupled to a spring depending on the desired smoothness of hinge motion.

Hinges 315A-315D can be constructed from planar material having an arced shape such that when the charge port body is in the concealed position a pair of corresponding hinges (315A and 315B, 315C and 315D) are positioned in a nested configuration (see for example FIG. 1A). In the nested configuration, a portion of the outer perimeter of hinge 315C adjacent to rotational coupling 355A can be positioned in the concave portion of the body of hinge 315D, and a portion of the outer perimeter of hinge 315D adjacent to rotational coupling 365 can be positioned in the concave portion of the body of hinge 315C. Thus, the arc of the concave portion of hinge 315C can be sized and shaped to accommodate the outer perimeter of hinge 315D around the rotational coupling 365, and the arc of the concave portion of hinge 315D can be sized and shaped to accommodate the outer perimeter of hinge 315C around the rotational coupling 355A.

Motor hinge 315D is fixedly coupled to an output of the motor 335 at connector 380 such that activation of the motor 335 rotates or pivots the motor hinge 315D a predetermined amount around axis 360. For example, motor hinge 315D can rotate anywhere in the range between 30 degrees and 180 degrees in various embodiments, and some embodiments preferably in the range between 80 degrees and 100 degrees. Slot 320B can be formed in the port housing to accommodate the movement of the flexible couplings of the hinges. As the motor hinge 315D rotates around axis 360, the rotational coupling 355B between motor hinge 315D and the charge port body travels along an arc-shaped path through slot 320B in the port housing 325, moving the charge port body 205 from the concealed position to the exposed position and concurrently causing movement of the rotational coupling 355A of hinge 315C to move along a different arc-shaped path through slot 320B. Corresponding motion occurs for hinges 315A and 315B on the opposing side of the charge port body 205. Such motion can move the port body 205 upward (from the bottom surface of the housing 325 toward the top surface of the housing 325) and also forward (from a rear surface of the housing 325 toward a front surface of the housing 325, where the charging interface within the port body 205 faces the front surface). When in the exposed position, the charge port body 205 may contact a portion of the housing 325 that functions as a heat sink for the heat generated during charging. For example, in some aspects, the housing 325 may include a heat sink 299 (shown in FIG. 2B). In some aspects, the charge port body 205 is not in contact with the heat sink 299 when the charge port body 205 is in the fully concealed position. The charge port body 205 may be configured to contact at least a portion of the heat sink 299 when the charge port body 205 is in the fully exposed position. In this way, heat generated during charging may be dissipated and transferred from the charge port body 205 to other portions of the vehicle. Thus, in some aspects, the charge port body 205 may move horizontally (i.e. from right to left in FIG. 2B) as well as vertically.

Figure 3F:
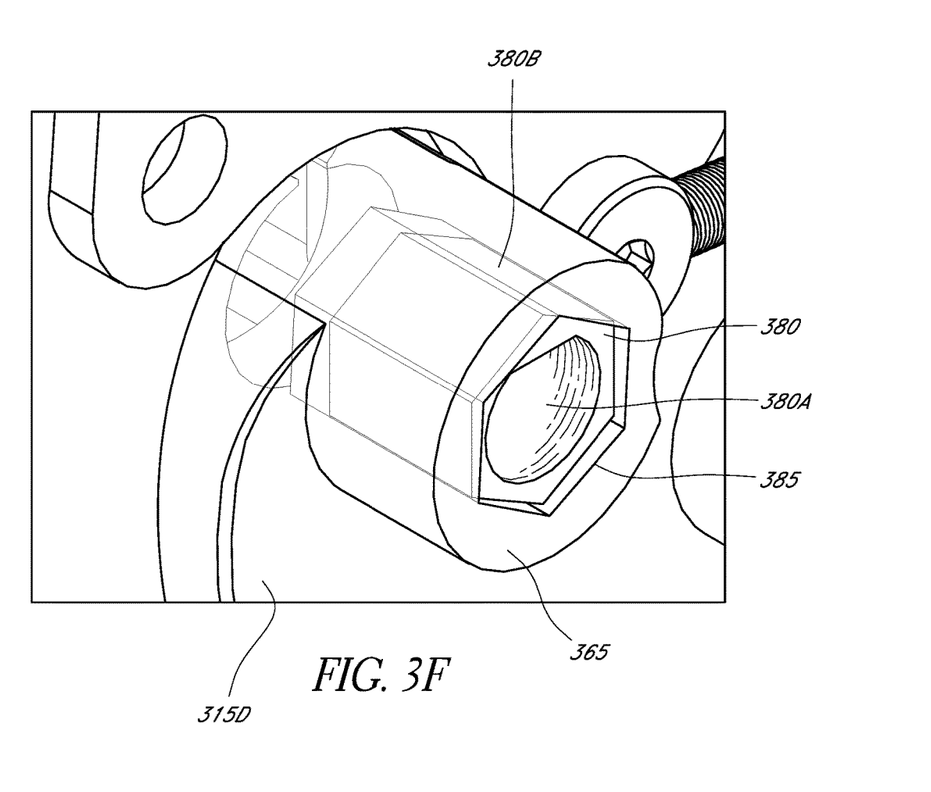
FIG. 3F illustrates an example connector of the port movement mechanisms of FIGS. 3A-3E.

As illustrated in FIG. 3F, connector 380 can be a shaft-to-shaft D-to-hex connector. The connector 380 can have an interior channel 380A with a "D-shaped" cross section—shaped as a cylinder having a flattened edge along the length of the cylinder. As such, an output shaft of motor 335 (not shown) having a corresponding outer shape and cross-sectional size can be inserted within the channel 380A such that torque from the motor is transmitted to connector 380. Further, connector 380 can have a hexagonal outer shape 380B. As such, when the connector 380 is positioned within hexagonal channel 385 of the rotational coupling shaft 365 motor hinge 315D, the torque from the motor is transmitted to the motor hinge 315D. In one example the motor output shaft or drive shaft can be press-fit within the D-shaped interior channel 380A, and the hexagonal exterior 380B of the connector 380A can be press-fit into the hexagonal channel 385 of the rotational coupling shaft 365. Such a connector 380 allows for an easy coupling of a D-shaped shaft and a hex connector without requiring special tooling or additional connecting screws.

In the illustrated hinge example, when the charge port body 205 is in the concealed position, rotational coupling 355B can be located at a position 375A in the lower end of slot 320B and rotational coupling 355A can be located at a position 375B in the lower end of slot 320B. As the motor rotates motor hinge 315D around axis 360, rotational coupling 355A travels along a first arc through slot 320B corresponding to the arc of the left side of the slot 320B and rotational coupling 355B travels along a second arc through slot 320B corresponding to the arc of the right side of the slot 320B. When the charge port body 205 is in the exposed position, rotational coupling 355B can be located at a position 375D near the upper end of slot 320B and rotational coupling 355A can be located at a position 375C in the upper end of slot 320B. A similar slot can be provided to accommodate the movement of the rotational couplings of hinges 315A, 315B through the opposing surface of the housing 325.

A locking pin 330 can be provided to prevent decoupling of the charging station connector and charge port interface during vehicle charging. After alignment of the connector and charge port and prior to charging, locking pin 330 can be extended and thereby inserted into a corresponding opening in the charging connector to secure it in place. In some aspects, the locking pin 330 is coupled to a separate motor that can move the locking pin from a first to a second position. When charging is complete, or when decoupling of the charging connector and charge port interface is otherwise desired, the locking pin 330 can be retracted to release the charging connector.

For example, the locking pin 330 may be supported by a hinged support structure 345 that moves the locking pin 330 between extended and retracted positions. As shown in FIG. 3C, a rod 390 can extend through an aperture 395 in the hinge 315C, through arcuate slot 320A in the housing 325, and into an elongate slot 345A in the support structure 345. Though not illustrated, the rod 390 can extend out of an opposing side of the elongate slot 345A, through an additional arcuate slot in an opposing wall of the housing 325, and into an aperture in hinge 315A mounted on the opposing wall. Thus, the movement of support structure 345 can be actuated by the hinges 315A-315D and motor 335 used to drive movement of the charge port body 205 as rotation of hinges 315A, 315C causes the rod 390 to move from a first end of arcuate slot 320A to a second end of arcuate slot 320A.

The motor 335 can be housed in control unit 340, which can optionally house additional components such as one or more processors with computer-executable instructions for controlling one or more of activation of the motor 335 to move the charge port body 205, charging of vehicle batteries via the charging interface, opening of a portion of the vehicle body exterior to reveal the charging interface, and extension/retraction of the locking pin 330.

Figure 4:
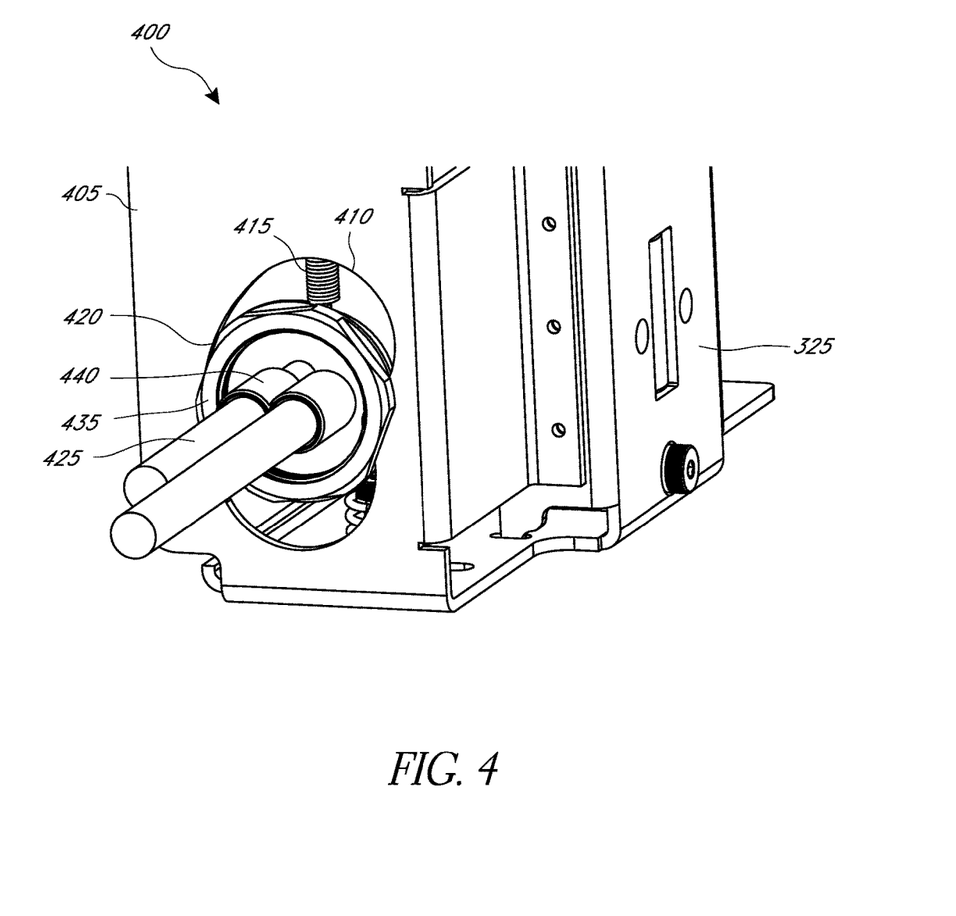
FIG. 4 illustrates example oscillation dampening mechanisms for cables of the charge port of FIGS. 2A-2C.

FIG. 4 illustrates example oscillation dampening mechanisms 400 for cables 425 extending between the charge port of FIGS. 2A-2C and a high-voltage battery bank of the electric vehicle (not illustrated). The oscillation dampening mechanisms 400 can provide dampening for oscillations and movements imparted to the cables 425 due to movement of the charge port body 205 between the concealed and exposed positions and/or due to movement of the flexibly mounted housing 425 due to forces acting on the electric vehicle. Such dampening can beneficially prevent structural weakening of the cables and accommodate movement of the cables with the port body 205 and/or port housing 325. Although two cables 425 are shown other implementations can include greater or fewer than two cables.

A wall 405 can be spaced apart from the housing 325 of the charge port along a length of the cables 425. The wall 405 can include an elongate slot 410 through which cables 425 pass. Cables can be secured by a bushing 420 slidably engaged in the slot 410. Bushing 420 can include a rubber bushing perimeter 435 that engages the edges of slot 410 and a central sleeve 440 for cable retention in one example. Bushing 420 can be secured to a protrusion 430 (illustrated in the view of FIG. 5) from, or other fastener attached to, wall 405 by a spring 415 that biases the bushing 420 towards an upper portion of slot 410 and also flexibly accommodates movement of the bushing 420 through slot 410. In the depicted example, slot 410 has an arced shape corresponding to the arc of movement of the port body 205 and the possible displacements of the port housing 325 due to its flexible mounting 500.

Although only one wall 405 and bushing 420 is illustrated, it will be appreciated that additional walls each having an elongate slot and spring-biased, cable-retaining bushing slidably engaged therein can be spaced apart at intervals (regular or irregular) along the length of cables 425 to provide further oscillation dampening until the cables reach a point where they are fixed relative to surrounding structures. In some implementations, the length and shape of the elongate slot may be the same in each additional wall. In other implementations the length of the elongate slot in each additional wall may decrease as the distance from the movable charge port increases.

Figure 5:
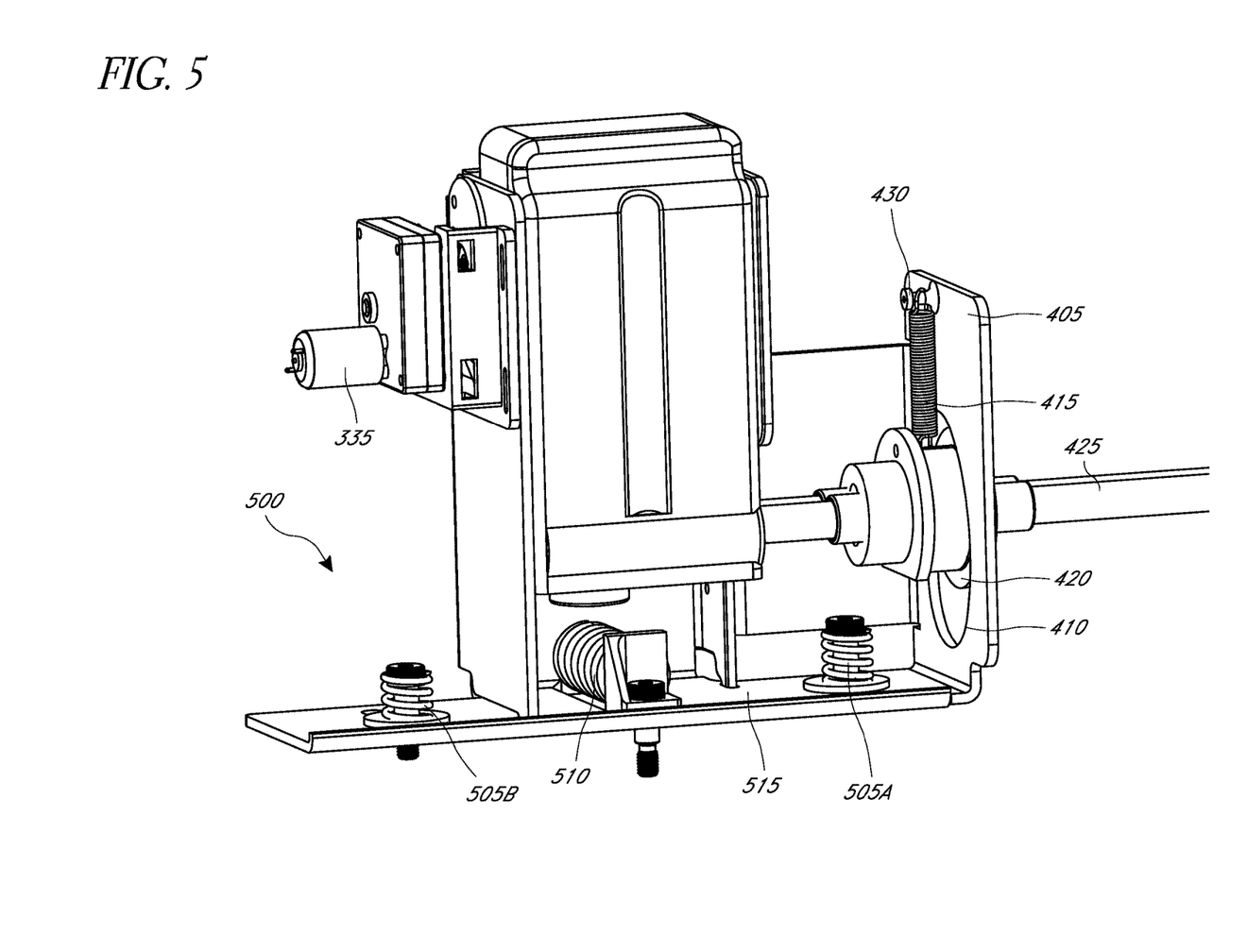
FIG. 5 illustrates example flexible housing mounting mechanisms for the charge port of FIGS. 2A-2C.

FIG. 5 illustrates example flexible housing mounting 500 for the charge port of FIGS. 2A-2C and provides an additional view of the oscillation dampening mechanisms 400 of FIG. 4. For example, a charge port located in a front portion of the electric vehicle may be subject to impact forces during collision of the vehicle with other objects. The flexible mounting 500 can cushion the charge port housing 325 from those forces and also provide a degree of increased flexibility of the vehicle for mitigating damage to the impacted object.

The illustrated flexible mounting 500 for the charge port housing can at least partially absorb the force of low-impact collisions (for example, up to around 15 miles per hour) in one or more linear or rotational direction. The flexible mounting 500 can include multiple force-absorbing systems each designed to absorb force on the charge port in a particular direction. For example, a first spring 510 can cushion forces acting on the charge port housing longitudinally (that is, along the axis extending between the front and back of the vehicle) by allowing a certain amount of movement along a longitudinal axis of the car. Additional springs 505A, 505B can cushion forces acting on the charge port housing vertically (that is, extending between the top and bottom of the vehicle) by allowing a certain amount of movement along a vertical axis of the car. Cooperation of springs 510, 505A, 505B can cushion forces acting on the charge port housing rotationally (that is, rotation along a lateral axis extending between left and right sides of the vehicle and perpendicular to the axis extending between the front and back of the vehicle) by allowing a certain amount of rotation around a lateral axis of the car. Thus, the base 515 of the charge port housing 325 can be flexibly mounted to a portion of the vehicle.

Accordingly, the flexible mounting 500 can include mechanical shock absorbing structures as depicted. In other implementations, the flexible mounting can include hydraulic shock absorbing structures to absorb impact force in one or more of the longitudinal, vertical, or rotational directions. Other embodiments of charge port housings can also include shock absorbing features for absorbing force in lateral (that is, extending between left and right sides of the vehicle) and other rotational directions.

Implementing Systems and Terminology

Implementations disclosed herein provide systems, methods and apparatus for charge ports mounted flexibly and movably and in a front portion of an electric vehicle. One skilled in the art will recognize that these embodiments may be implemented in hardware or a combination of hardware and software or firmware.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component.

The automated charge port movement processes and functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. The term "computer-readable medium" refers to a computing device or hardware processor in combination with code or instructions (e.g., a "program") that may be executed, processed or computed by the computing device or processor. As used herein, the terms "code" or "instructions" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least partly on."

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and features disclosed herein.

What is claimed is:

1. A movable charge port for an electric vehicle, the charge port comprising:
   a housing secured within a portion of the electric vehicle;
   a charge port body disposed at least partially within the housing, the charge port body including at least one electrical contact configured to be electrically coupled to a corresponding electrical contact of a charging station connector;
   a hinge coupled to at least a portion of the charge port body; and
   a motor coupled to the hinge, the motor configured to move the charge port body between a first position and a second position relative to the housing.

2. The charge port of claim 1, wherein when motor is coupled to a rotatable drive shaft and the rotatable drive shaft is coupled to the hinge.

3. The charge port of claim 1, wherein the hinge includes a first rotational coupling between the hinge and the charge port body and a second rotational coupling between the hinge and the housing, the first rotational coupling located at a first location and the second rotational coupling located at a second location spaced apart from the first location.

4. The charge port of claim 3, wherein rotation of the hinge cause a locking pin to move into a deployed position for securing a portion of the charge port body to a charging connector.

5. The charge port of claim 3, further comprising an additional hinge including a third rotational coupling between the hinge and the charge port body and a fourth rotational coupling between the hinge and the housing, the third rotational coupling located at a third location and the fourth rotational coupling located at a fourth location spaced apart from the third location.

6. The charge port of claim 5, wherein a body of each of the hinge and the additional hinge comprises an arced shape such that, with the charge port body in the first position, the hinge and the additional hinge are positioned in a nested configuration.

7. The charge port of claim 1, further comprising:
   at least one cable extending between the charge port body and a battery of the electric vehicle;
   a first wall spaced apart from the housing, the first wall including a first elongate slot, wherein the at least one cable extends through the first elongate slot; and a first bushing securing the at least one cable, the first bushing slidably engaged in the first elongate slot.

8. The charge port of claim 7, further comprising a spring coupling the first bushing to a protrusion extending from the first wall.

9. The charge port of claim 7, further comprising:
a second wall spaced apart from the first wall along a length of the at least one cable, the second wall including a second elongate slot, wherein the at least one cable extends through the second elongate slot; and
a second bushing securing the at least one cable, the second bushing slidably engaged in the second elongate slot.

10. The charge port of claim 7, further comprising a first spring coupling the housing to the portion of the electric vehicle, the first spring extending along a longitudinal axis of the electric vehicle, wherein the first spring permits linear movement of the housing along the longitudinal axis.

11. The charge port of claim 10, further comprising at least a second spring coupling the housing to the portion of the electric vehicle, the second spring extending along a vertical axis of the electric vehicle, wherein the at least second spring permits linear movement of the housing along the vertical axis.

12. The charge port of claim 1, wherein the portion of the electric vehicle to which the housing is secured is a front portion of the electric vehicle.

13. A charge port for an electric vehicle, the charge port comprising:
a charge port body including at least one electrical contact configured to be electrically coupled to a corresponding electrical contact of a charging station connector;
a housing securing the charge port body to a portion of the electric vehicle;
at least one cable extending between the charge port body and a battery of the electric vehicle and electrically coupling the at least one electrical contact of the charge port body with the battery;
at least one wall spaced apart from the housing, the at least one wall including an elongate slot, wherein the at least one cable extends through the elongate slot;
a bushing securing the at least one cable, the bushing slidably engaged in the elongate slot; and a motor coupled to the charge port body and configured to move the charge port body between a first position and a second position, wherein in the first position the electrical contact of the charge port body is concealed by a portion of an exterior of the electric vehicle, and wherein in the second position the electrical contact of the charge port body is exposed through the portion of the exterior of the electric vehicle.

14. The charge port of claim 13, further comprising a spring coupling the bushing to a protrusion of the at least one wall.

15. The charge port of claim 13, further comprising an additional wall spaced apart from the at least one wall along a length of the at least one cable, the additional wall including an additional elongate slot, wherein the at least one cable extends through the additional elongate slot.

16. The charge port of claim 15, further comprising an additional bushing securing the at least one cable, the additional bushing slidably engaged in the additional elongate slot.

17. The charge port of claim 13, wherein the bushing is configured to dampen oscillations imparted to the at least one cable from movement of one or both of the charge port body and housing.

18. The charge port of claim 17, further comprising a first spring coupling the housing to the portion of the electric vehicle, the first spring extending along a longitudinal axis of the electric vehicle, wherein the first spring permits linear movement of the housing along the longitudinal axis.

19. The charge port of claim 18, further comprising at least a second spring coupling the housing to the portion of the electric vehicle, the second spring extending along a vertical axis of the electric vehicle, wherein the at least second spring permits linear movement of the housing along the vertical axis.

* * * * *